(12) United States Patent
Noda et al.

(10) Patent No.: US 10,024,421 B2
(45) Date of Patent: Jul. 17, 2018

(54) HYDRAULIC PRESSURE CONTROL DEVICE OF VEHICLE DRIVING DEVICE

(71) Applicants: AISIN AW CO., LTD., Anjo-shi, Aichi-ken (JP); TOYOTA JIDOSHA KABUSHIKI KAISHA, Toyota-shi, Aichi-ken (JP)

(72) Inventors: Kazuyuki Noda, Handa (JP); Yoshimitsu Hyodo, Nishio (JP); Kousuke Tanaka, Nishio (JP); Aito Ide, Okazaki (JP); Kota Fujii, Nisshin (JP); Atsushi Tabata, Okazaki (JP); Ryuji Ibaraki, Miyoshi (JP); Yuji Yasuda, Miyoshi (JP); Haruhisa Suzuki, Miyoshi (JP); Koichi Okuda, Toyota (JP)

(73) Assignees: AISIN AW CO., LTD., Anjo (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/514,286

(22) PCT Filed: Oct. 2, 2015

(86) PCT No.: PCT/JP2015/078109
§ 371 (c)(1),
(2) Date: Mar. 24, 2017

(87) PCT Pub. No.: WO2016/052745
PCT Pub. Date: Apr. 7, 2016

(65) Prior Publication Data
US 2017/0268661 A1    Sep. 21, 2017

(30) Foreign Application Priority Data

Oct. 3, 2014    (JP) .................................. 2014-204569

(51) Int. Cl.
*F16H 61/12* (2010.01)
*B60K 6/445* (2007.10)
(Continued)

(52) U.S. Cl.
CPC ............. *F16H 61/12* (2013.01); *B60K 6/445* (2013.01); *B60W 20/50* (2013.01);
(Continued)

(58) Field of Classification Search
USPC ......................................................... 477/906
See application file for complete search history.

(56) References Cited

U.S. PATENT DOCUMENTS 5,437,204 A * 8/1995 Person ................... F16H 59/105
475/133
5,682,792 A * 11/1997 Liesener ................. F16H 61/12
477/155

(Continued)

FOREIGN PATENT DOCUMENTS

JP    2001-108091 A    4/2001
JP    2007-146901 A    6/2007

(Continued)

OTHER PUBLICATIONS

Jan. 12, 2016 Search Report issued in International Patent Application No. PCT/JP2015/078109.

*Primary Examiner* — Dirk Wright
(74) *Attorney, Agent, or Firm* — Oliff PLC

(57) ABSTRACT

A hydraulic pressure control device of a vehicle driving device, the hydraulic pressure control device includes a range switcher having a first signal solenoid valve capable of supplying a first signal pressure and a spool switchable between a first position reached via the first signal pressure and a second position reached via a biasing force of a biasing member.

18 Claims, 5 Drawing Sheets

(51) Int. Cl.
  *B60W 20/50* (2016.01)
  *B60W 50/035* (2012.01)
  *F16H 61/00* (2006.01)
  *F16H 3/72* (2006.01)
  *F16H 3/66* (2006.01)

(52) U.S. Cl.
  CPC ........ *B60W 50/035* (2013.01); *B60Y 2200/92* (2013.01); *F16H 3/66* (2013.01); *F16H 3/725* (2013.01); *F16H 61/0021* (2013.01); *F16H 2061/1232* (2013.01); *F16H 2061/1244* (2013.01); *F16H 2200/2041* (2013.01); *F16H 2200/2066* (2013.01); *F16H 2200/2082* (2013.01); *Y10S 903/911* (2013.01); *Y10S 903/945* (2013.01)

(56) References Cited

U.S. PATENT DOCUMENTS

| | | | | |
|---|---|---|---|---|
| 5,941,794 A * | 8/1999 | Jang | ............... | F16H 61/0206 477/143 |
| 6,077,182 A * | 6/2000 | Long | ............... | F16H 61/12 475/128 |
| 6,102,826 A * | 8/2000 | Takahashi | ............... | F16H 61/12 475/119 |
| 7,140,993 B2 * | 11/2006 | Long | ............... | F16H 61/12 475/119 |
| 7,510,496 B2 * | 3/2009 | Long | ............... | F16H 61/0206 475/116 |
| 7,611,434 B2 * | 11/2009 | Fukushima | ............. | F16H 61/12 475/119 |
| 7,618,344 B2 * | 11/2009 | Hayashi | ............... | F16H 61/12 477/131 |
| 8,187,148 B2 * | 5/2012 | Petzold | ............... | F16D 48/02 477/70 |
| 2007/0117678 A1 | 5/2007 | Fukushima et al. | | |
| 2008/0207375 A1 | 8/2008 | Shimizu et al. | | |
| 2009/0143180 A1 | 6/2009 | Shimizu et al. | | |
| 2013/0109533 A1 | 5/2013 | Matsubara et al. | | |

FOREIGN PATENT DOCUMENTS

| | | |
|---|---|---|
| JP | 2008-025773 A | 2/2008 |
| JP | 2009-133435 A | 6/2009 |
| JP | 2009-150532 A | 7/2009 |
| JP | 2012-224289 A | 11/2012 |
| JP | 2013-096422 A | 5/2013 |
| WO | 2008/078530 A1 | 7/2008 |

* cited by examiner

FIG. 2

|  | FIRST CLUTCH C1 | SECOND CLUTCH C2 | FIRST BRAKE B1 | SECOND BRAKE B2 |
|---|---|---|---|---|
| P/N/R | ○ |  |  | ○ |
| 1st | ○ |  |  | ○ |
| 2nd | ○ |  | ○ |  |
| 3rd | ○ | ○ |  |  |
| 4th |  | ○ | ○ |  |

HYDRAULIC PRESSURE CONTROL DEVICE OF VEHICLE DRIVING DEVICE

BACKGROUND

The present disclosure relates to a hydraulic pressure control device of a vehicle driving device to be mounted in, for example, a vehicle.

Conventionally, an automatic transmission capable of forming a plurality of transmission shift stages by engaging and releasing engagement elements such as a plurality of clutches and brakes has been widely used as an automatic transmission having a multi-stage transmission. In addition, hybrid vehicles having an internal combustion engine and a rotary electric machine as driving sources have been widely used and a vehicle driving device having the above automatic transmission is known as a vehicle driving device to be mounted in such hybrid vehicles (JP-A-2013-96422). In this vehicle driving device, by operating a solenoid valve and the like of the hydraulic pressure control device, the forward first stage is achieved by combining a clutch with a brake or combining a clutch with a one-way clutch, and the forward second to fourth stages are achieved by combining two clutches or combining a clutch with a brake. In addition, in the vehicle driving device, the reverse first stage is achieved by forming a transmission shift state using the same combination of a clutch and a brake as in the forward first stage and reversely rotating the electric motor. In the vehicle driving device, when switching to the forward second to fourth stages has been made, since the one-way clutch prevents reverse rotation even if an attempt is made to reverse the electric motor for reverse travel, the reverse second to fourth stages cannot be achieved.

SUMMARY

However, in the vehicle driving device described in JP-A-2013-96422, if an all-off-fail occurs because, for example, all solenoid valves of the hydraulic pressure control device are unenergized, a fail-safe mechanism for addressing it is not provided. As a fail-safe mechanism against such an all-off-fail, for example, there may be a function for causing an automatic transmission to enter the state of the forward first stage capable of performing forward and reverse travel at the time of occurrence of an all-off-fail. In this case, since the vehicle speed of forward travel shifts to a lower speed side at the time of occurrence of an all-off-fail, the time necessary for evacuating the vehicle becomes longer than in the case in which high speed travel is enabled.

An exemplary aspect of the disclosure provides a hydraulic pressure control device of a vehicle driving device capable of reducing the time necessary for evacuating the vehicle when an all-off-fail occurs in all solenoid valves.

A hydraulic pressure control device of a vehicle driving device according to an exemplary aspect of the disclosure includes a rotary electric machine capable of switching a rotational direction of a driving force to be output between forward and reverse directions; an input coupled to the rotary electric machine; an output coupled to a wheel; an oil pump supplying a hydraulic pressure; an automatic transmission disposed in a power transmission path between the input and the output, the automatic transmission having a plurality of engagement elements engaged or released by supplying or draining the hydraulic pressure through control of solenoid valves, the automatic transmission forming a first transmission shift stage or a second transmission shift stage slower than the first transmission shift stage by combining the engagement elements to be engaged or released, the automatic transmission disallowing a reverse rotation output of the rotary electric machine at the first transmission shift stage, wherein reverse travel of a vehicle is achieved by reversely rotating the rotary electric machine while forming the second transmission shift stage; and a range switcher having a first signal solenoid valve capable of supplying a first signal pressure and a spool switchable between a first position reached via the first signal pressure and a second position reached via a biasing force of a biasing member, wherein: the range switcher switches the spool to the first position and self-holds the spool when a shift position is present in a forward travel range and a normal mode is entered, the range switcher keeps on self-holding the spool in the first position and supplies the hydraulic pressure to the engagement elements forming the first transmission shift stage when the shift position is present in the forward travel range and an all-off-fail mode in which no solenoid valves are energized is entered, the range switcher switches the spool to the second position when the shift position is present in a reverse travel range and the normal mode is entered, and the range switcher supplies the hydraulic pressure to the engagement elements forming the second transmission shift stage when the shift position is present in the reverse travel range and the all-off-fail mode is entered.

In the hydraulic pressure control device of a vehicle driving device, the first transmission shift stage is formed when the shift position is present in the forward travel range at the time of occurrence of an all-off-fail and the second transmission shift stage is formed when the shift position is present in the reverse travel range. Therefore, at the time of occurrence of an all-off-fail, the forward and reverse travel of a vehicle is enabled at the second transmission shift stage and high speed travel is enabled at the first transmission shift stage, which is higher than the second transmission shift stage, so the time necessary for evacuating the vehicle can be reduced as compared with travel using only the second transmission shift stage.

BRIEF DESCRIPTION OF THE DRAWINGS

Various exemplary aspects of the disclosure will be described with reference to the drawings, wherein:

FIG. 2 illustrates an engagement table for an automatic transmission according to the first embodiment.

DETAILED DESCRIPTION OF EMBODIMENTS

First Embodiment

Figure 1:
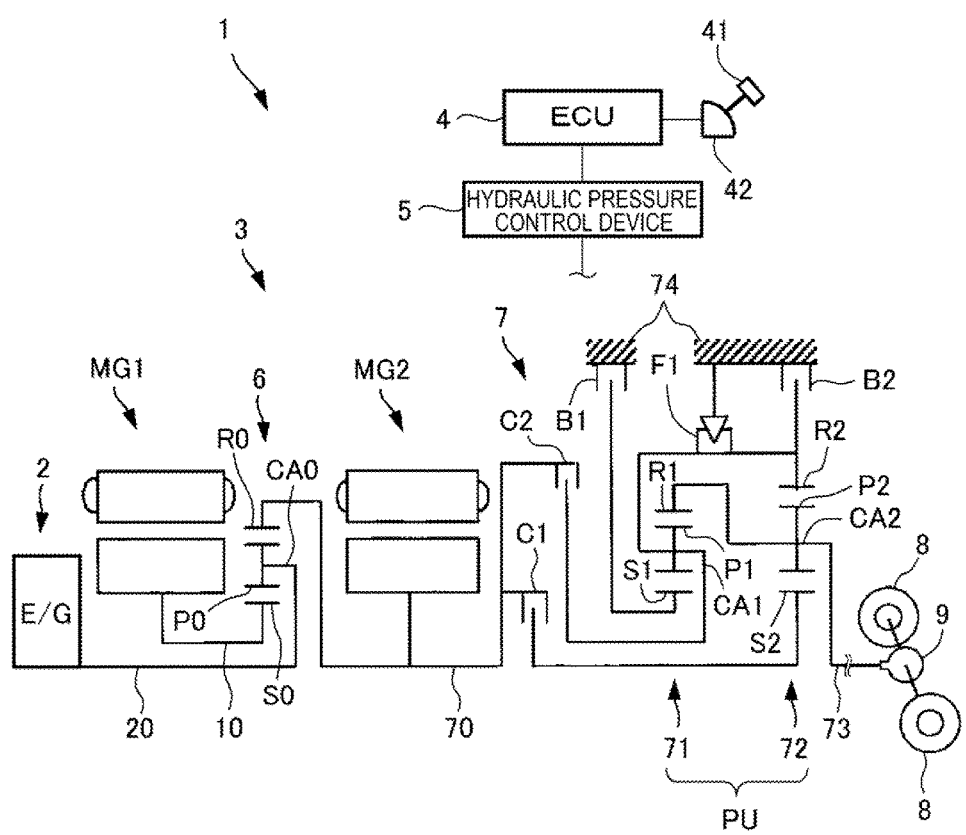
FIG. 1 is a skeleton view illustrating a vehicle driving device according to a first embodiment.

A hydraulic pressure control device 5 of a vehicle driving device 3 according to the first embodiment will be described with reference to FIGS. 1 to 4. In this specification, "coupling" indicates the state in which rotary elements are coupled to each other so as to transfer a driving force and includes the state in which the rotary elements are coupled to each other so as to be integrally rotatable or the state in which the rotary elements are coupled to each other via a clutch or the like so as to transfer a driving force.

The schematic structure of a vehicle 1 having the vehicle driving device 3 according to the embodiment will be described with reference to FIG. 1. The vehicle 1 includes an internal combustion engine 2, the vehicle driving device 3, a control device (ECU) 4, the hydraulic pressure control device 5, and a wheel 8. The internal combustion engine 2 is an internal combustion engine such as, for example, a gasoline engine or diesel engine and directly coupled to the vehicle driving device 3. However, the internal combustion engine 2 does not need to be directly coupled to the vehicle driving device 3 and may be coupled via, for example, a torque converter or the like.

Figure 4:
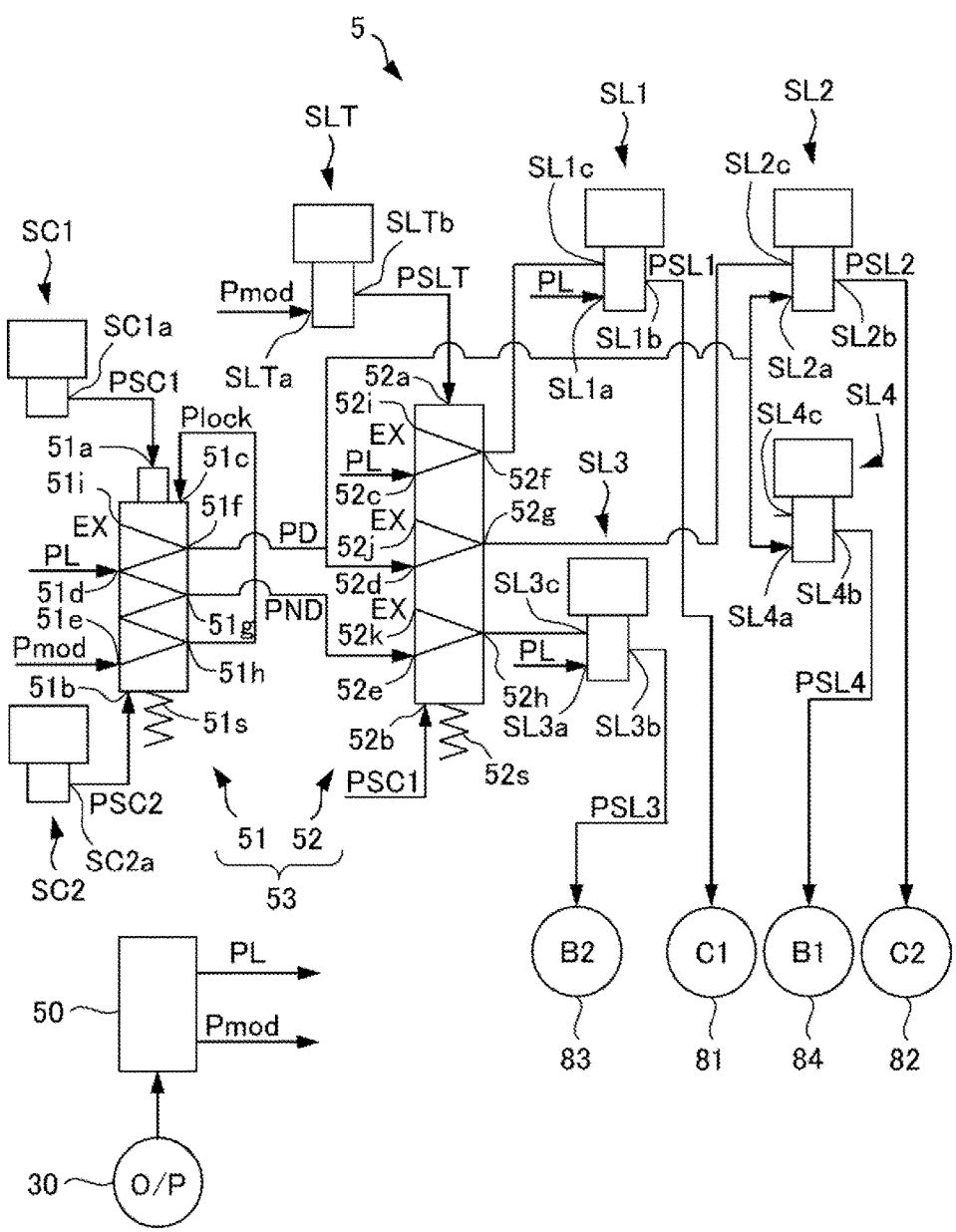
FIG. 4 is an explanatory diagram illustrating a hydraulic pressure control device according to the first embodiment.

The vehicle driving device 3 includes a first electric motor (electric generator) MG1, a second electric motor (rotary electric machine) MG2, a power distribution mechanism 6, an automatic transmission 7, a differential gear device 9 transferring, to the wheel 8, a driving force output from an output member 73 (i.e., output) of the automatic transmission 7, and an oil pump 30 (see FIG. 4). Both the first electric motor MG1 and the second electric motor MG2 are so-called motor generators that function as motors and electric generators. The first electric motor MG1 has at least the generator (electric power generation) function for generating a reaction force and the second electric motor MG2 has at least the motor function for outputting a driving force as a driving force source for travel. The second electric motor MG2 can switch the rotational direction of a driving force to be output between the forward and reverse directions. As the oil pump 30, it is possible to use an appropriate pump such as, for example, a mechanical oil pump operated by a driving force transferred from an input member 70 (i.e., input) or an electric oil pump driven by an electric motor disposed separately from the first electric motor MG1 and the second electric motor MG2.

The power distribution mechanism 6 includes a differential mechanism that transfers the driving force of an output shaft 20 of the internal combustion engine 2 while distributing the driving force among a rotary shaft 10 of the first electric motor MG1 and the input member 70. Accordingly, the power distribution mechanism 6 functions as an electric differential unit in which the operational state is controlled via the first electric motor MG1 and the second electric motor MG2 and the differential state of the input rotational speed (the rotation speed of the output shaft 20) and the output rotation speed (the rotation speed of the input member 70) is thereby controlled.

Specifically, the power distribution mechanism 6 is mainly configured by a planetary gear device of single pinion type and includes, as rotary elements, a sun gear S0, a pinion gear P0, a carrier CA0 rotatably and revolvably supporting the pinion gear P0, and a ring gear R0 meshing with the sun gear S0 via the pinion gear P0. The carrier CA0 is coupled to the output shaft 20, the sun gear S0 is coupled to the rotary shaft 10, and the ring gear R0 is coupled to the input member 70. Since the sun gear S0, the carrier CA0, and the ring gear R0 are relatively rotatable and put in the differential state in the power distribution mechanism 6, the output of the internal combustion engine 2 is distributed among the first electric motor MG1 and the input member 70 and electric energy generated by the first electric motor MG1 using part of the distributed output of the internal combustion engine 2 is stored or the second electric motor MG2 is rotatably driven by the part of the distributed output of the internal combustion engine 2.

The automatic transmission 7 includes the input member 70 coupled to the second electric motor MG2, a planetary gear unit PU having a first planetary gear 71 and a second planetary gear 72, a first clutch (engagement element, the first engagement element) C1, a second clutch (engagement element, second engagement element) C2, a first brake (engagement element) B1, a second brake (engagement element, third engagement element) B2, a one-way clutch F1, the output member 73 coupled to the wheel 8, and a case 74 accommodating these components.

The first planetary gear 71 is of single pinion type and includes, a sun gear (fourth rotary element) S1, a pinion gear P1, a carrier (third rotary element) CA1 rotatably and revolvably supporting the pinion gear P1, and a ring gear (second rotary element) R1 engaged with the sun gear S1 via the pinion gear P1. Similarly, the second planetary gear 72 is also of single pinion type and includes a sun gear (first rotary element) S2, a pinion gear P2, a carrier (second rotary element) CA2 rotatably and revolvably supporting the pinion gear P2, and a ring gear (third rotary element) R2 engaged with the sun gear S2 via the pinion gear P2.

In the automatic transmission 7, the first clutch C1 can engage the input member 70 with the sun gear S2, the second clutch C2 can engage the input member 70 with the carrier CA1 and the ring gear R2, the first brake B1 can lock the case 74 with the sun gear S1, the second brake B2 can lock the case 74 with the carrier CA1 and the ring gear R2, the one-way clutch F1 is engaged in a reversed rotational direction of the carrier CA1 and the ring gear R2 with respect to the case 74, the carrier CA2 and the ring gear R1 are coupled to the output member 73.

As illustrated in FIG. 4, the first clutch C1 is a hydraulic frictional engagement element and of multiplate wet type in which a plurality of friction plates laminated with each other are pushed and engaged by supply of an engagement pressure PSL1 to a hydraulic servo 81. Similarly, the second clutch C2 is engaged by an engagement pressure PSL2 to a hydraulic servo 82, the first brake B1 is engaged by an engagement pressure PSL4 to a hydraulic servo 84, and the second brake B2 is engaged by an engagement pressure PSL3 to a hydraulic servo 83.

Figure 3:
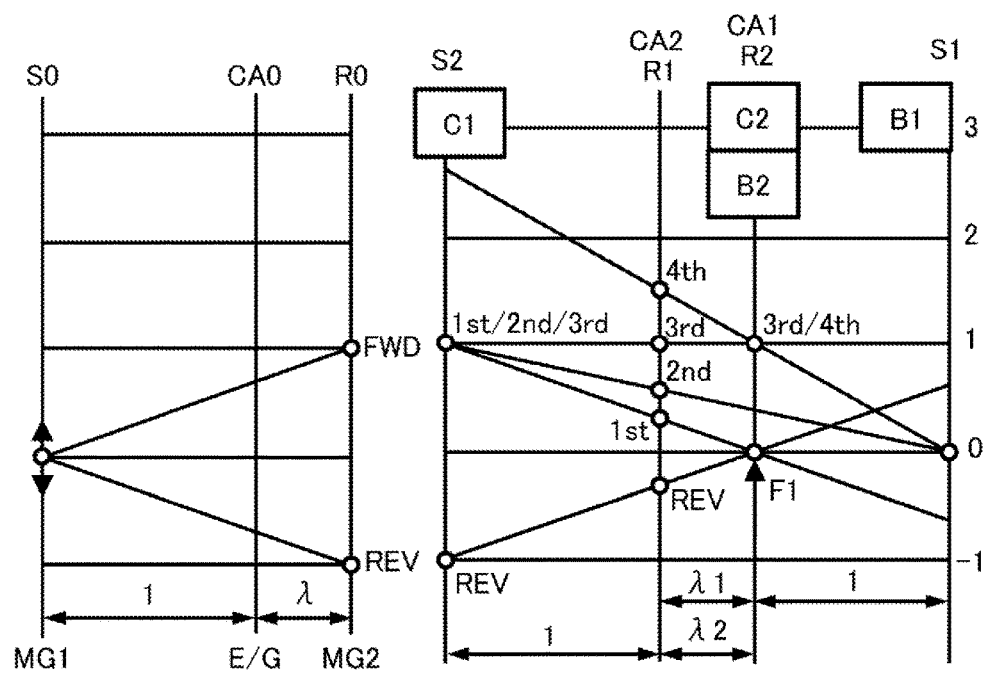
FIG. 3 is a velocity diagram illustrating the automatic transmission according to the first embodiment.

In the automatic transmission 7 configured as described above, the first clutch C1, the second clutch C2, the first brake B1, and the second brake B2 illustrated in the skeleton view in FIG. 1 are engaged and released according to the combinations illustrated in the engagement table in FIG. 2 to achieve the forward range (forward travel range) (1st, 2nd, 3rd, 4th) and non-forward range (reverse travel range) (P/N/R) (see the velocity diagram in FIG. 3). That is, the automatic transmission 7 forms the forward third stage (first transmission shift stage) by engaging the first clutch C1 with the second clutch C2 and forms the forward first stage or non-forward range (second transmission shift stage) (simply referred to below as the forward first stage) by engaging the first clutch C1 with the one-way clutch F1 or the second brake B2.

At the second transmission shift stage, the vehicle 1 can achieve reverse travel by reversely rotating the second electric motor MG2. Accordingly, in the embodiment, when the automatic transmission 7 forms the forward first stage, the vehicle 1 can travel reversely as well as travel forward, using the second electric motor MG2. In contrast, at the first transmission shift stage, even when an attempt is made to reverse the second electric motor MG2, the one-way clutch F1 allows only a forward rotation output and does not allow a reverse rotation output. Accordingly, in the embodiment, when the automatic transmission 7 forms the forward third stage, the vehicle 1 can travel forward only. That is, the automatic transmission 7 forms the forward third stage or the forward first stage by combining the first clutch C1, the second clutch C2, the first brake B1, and the second brake B2 to be engaged and released and does not allow the reverse rotation output of the second electric motor MG2 at the forward third stage.

The ECU 4 includes, for example, a CPU, a ROM storing processing programs, a RAM temporarily storing data, input/output ports, and a communication port and outputs various types of signals such as control signals for solenoid valves of the hydraulic pressure control device 5 and the like through the output port. The vehicle 1 is provided with a shift lever 41 used by the driver to selectively operate the travel range and a shift position detection unit 42 for detecting the shift position of the shift lever 41 and the shift position detection unit 42 is connected to the ECU4 via an input port.

As illustrated in FIG. 4, the hydraulic pressure control device 5 includes an original pressure supply unit 50, a first linear solenoid valve (solenoid valve, first solenoid valve) SL1, a second linear solenoid valve (solenoid valve, second solenoid valve) SL2, a third linear solenoid valve (solenoid valve, third solenoid valve) SL3, a fourth linear solenoid valve SL4, a first signal solenoid valve SC1, a second signal solenoid valve SC2, a linear solenoid valve SLT, and a range switching unit 53 (i.e., range switcher). The range switching unit 53 includes a range switching valve (first switching valve) 51 and a fail-safe valve (second switching valve) 52.

The original pressure supply unit 50 adjusts the hydraulic pressure supplied from the oil pump 30 to a line pressure (original pressure) PL and a modulator pressure Pmod based on the throttle opening using a primary regulator valve (not illustrated), a secondary regulator valve (not illustrated), a modulator valve (not illustrated), and the like.

The first linear solenoid valve SL1 includes an input port SL1$a$ to which the line pressure PL is input, an output port SL1$b$ communicating with the hydraulic servo 81 of the first clutch C1, and a drain port SL1$c$ and freely controls and adjusts the line pressure PL to be input, generates the engagement pressure PSL1 to be supplied to the hydraulic servo 81, and supplies the engagement pressure PSL1 through the output port SL1$b$. The first linear solenoid valve SL1 is of normal close type that does not output a hydraulic pressure during non-energization.

The second linear solenoid valve SL2 includes an input port SL2$a$ to which a forward range pressure PD is input, an output port SL2$b$ communicating with the hydraulic servo 82 of the second clutch C2, and a drain port SL2$c$ and freely controls and adjusts the forward range pressure PD to be input, generates the engagement pressure PSL2 to be supplied to the hydraulic servo 82, and supplies the engagement pressure PSL2 through the output port SL2$b$. The second linear solenoid valve SL2 is of normal close type that does not output a hydraulic pressure during non-energization.

The third linear solenoid valve SL3 includes an input port SL3$a$ to which the line pressure PL is input, an output port SL3$b$ communicating with the hydraulic servo 83 of the second brake B2, and a drain port SL3$c$ and freely controls and adjusts the line pressure PL to be input, generates the engagement pressure PSL3 to be supplied to the hydraulic servo 83, and supplies the engagement pressure PSL3 through the output port SL3$b$. The third linear solenoid valve SL3 is of normal close type that does not output a hydraulic pressure during non-energization.

The fourth linear solenoid valve SL4 includes an input port SL4$a$ to which the forward range pressure PD is input, an output port SL4$b$ communicating with the hydraulic servo 84 of the first brake B1, and a drain port SL4$c$ and freely controls and adjusts the forward range pressure PD to be input, generates the engagement pressure PSL4 to be supplied to the hydraulic servo 84, and supplies the engagement pressure PSL4 through the output port SL4$b$. The fourth linear solenoid valve SL4 is of normal close type that does not output a hydraulic pressure during non-energization.

The first signal solenoid valve SC1 includes an input port (not illustrated) to which the modulator pressure Pmod is input and an output port SC1$a$ capable of outputting a first signal pressure PSC1 generated based on the modulator pressure Pmod and can control the range switching valve 51 and the fail-safe valve 52 according to the first signal pressure PSC to be output. The first signal solenoid valve SC1 is of normal close type that does not output a hydraulic pressure during non-energization.

The second signal solenoid valve SC2 has an input port (not illustrated) to which the modulator pressure Pmod is input and an output port SC2$a$ capable of outputting a second signal pressure PSC2 generated based on the modulator pressure Pmod and can control the range switching valve 51 according to the second signal pressure PSC2 to be output. The second signal solenoid valve SC2 is of normal close type that does not output a hydraulic pressure during non-energization.

The linear solenoid valve SLT includes an input port SLT$a$ to which the modulator pressure Pmod is input and an output port SLT$b$ outputting an SLT pressure PSLT based on, for example, the throttle opening or the like so as to control and adjust the pressure of the primary regulator valve or the secondary regulator valve of the original pressure supply unit 50 and control the fail-safe valve 52. The linear solenoid valve SLT is of normal open type that outputs a hydraulic pressure during non-energization.

The range switching valve 51 includes a spool (first spool) capable of making switching between the first position indicated by the oil path on the lower side in the drawing and the second position indicated by the oil path on the upper side in a drawing and a spring (biasing member) 51$s$ having a compression coil spring biasing the spool to the second position. The range switching valve 51 includes a first working oil chamber 51$a$, a second working oil chamber 51$b$, and a third working oil chamber 51$c$. The first working oil chamber 51$a$ inputs the first signal pressure PSC1 in a direction in which the spool is pushed to the first position, and the second working oil chamber 51$b$ inputs the second signal pressure PSC2 in a direction in which the spool is pushed to the second position, and the third working oil chamber 51$c$ inputs a holding pressure (lock pressure) Plock in a direction in which a diameter difference portion of the spool is pushed to the first position. Accordingly, the spool is pushed to the second position when the first signal solenoid valve SC1 is not energized.

The range switching valve 51 includes a first input port 51$d$ to which the line pressure PL is input and a second input port 51$e$ to which the modulator pressure Pmod is input. In addition, the range switching valve 51 includes a first output port 51$f$ communicating with the input port SL2$a$ of the second linear solenoid valve SL2, the input port SL4$a$ of the fourth linear solenoid valve SL4, and a second input port 52$d$ of the fail-safe valve 52, a second output port 51$g$ communicating with a third input port 52$e$ of the fail-safe valve 52, a third output port 51$h$ communicating with the third working oil chamber 51$c$, and a drain port 51$i$.

In the range switching valve 51, when the spool is present in the first position, the first input port 51d communicates with the first output port 51f and the second input port 51e communicates with the third output port 51h. At this time, the line pressure PL supplied to the first input port 51d is output from the first output port 51f as the forward range pressure (first hydraulic pressure) PD. In addition, since the modulator pressure Pmod supplied to the second input port 51e is output from the third output port 51h as the holding pressure Plock and supplied to the third working oil chamber 51c, the range switching valve 51 is self-held in the first position. At the time of the self-holding, even when the first signal pressure PSC1 is not supplied, the range switching valve 51 is self-held in the first position. In addition, when the second signal pressure PSC2 is supplied at the time of the self-holding or when the oil pump 30 stops and the supply of the modulator pressure Pmod stops, the self-holding is released and switching to the second position is made.

In the range switching valve 51, when the spool is present in the second position, the first input port 51d communicates with the second output port 51g and the first output port 51f is drained. At this time, the line pressure PL supplied to the first input port 51d is output through the second output port 51g as a non-forward range pressure (second hydraulic pressure) PND.

The fail-safe valve 52 includes a spool (second spool) capable of making switching between the normal position indicated by the oil path on the upper side in the drawing and the fail position indicated by the oil path on the lower side in the drawing and a spring 52s having a compression coil spring biasing the spool to the normal position. The fail position is the position reached in the all-off-fail mode in which no solenoid valves are energized and, for example, the all-off-fail mode occurs when an electric wire for energizing all solenoid valves is broken or the all-off-fail mode is selected by determination by the ECU4. In addition, the normal position is the position reached in a normal mode other than the all-off-fail mode.

The fail-safe valve 52 includes a first working oil chamber 52a inputting the SLT pressure PSLT in a direction in which the spool is pushed to the fail position and a second working oil chamber 52b inputting the first signal pressure PSC1 in a direction in which the spool is pushed to the normal position. Accordingly, the first signal pressure PSC1 is input to the second working oil chamber 52b and the spool is thereby locked in the normal position. In addition, the range switching valve 51 includes a first input port 52c to which the line pressure PL is input, the second input port 52d to which the forward range pressure PD is input, and the third input port 52e to which the non-forward range pressure PND is input. In addition, the fail-safe valve 52 includes a first output port 52f communicating with the drain port SL1c of the first linear solenoid valve SL1, a second output port 52g communicating with the drain port SL2c of the second linear solenoid valve SL2, a third output port 52h communicating with a drain port SL3c of the third linear solenoid valve SL3, and drain ports 52i, 52j, and 52k.

In the fail-safe valve 52, when the spool is present in the normal position, the first output port 52f, the second output port 52g, and the third output port 52h are drained. This enables the first clutch C1 communicating with the first linear solenoid valve SL1, the second clutch C2 communicating with the second linear solenoid valve SL2, and the second brake B2 communicating with the third linear solenoid valve SL3 to be drained. In addition, when the spool is present in the normal position, the first input port 52c, the second input port 52d, and the third input port 52e are blocked.

In the fail-safe valve 52, when the spool is present in the fail position, the first input port 52c communicates with the first output port 52f, the second input port 52d communicates with the second output port 52g, and the third input port 52e communicates with the third output port 52h. At this time, the line pressure PL input to the first input port 52c is reversely input to the drain port SL1c of the first linear solenoid valve SL1 through the first output port 52f and supplied to the hydraulic servo 81 of the first clutch C1 to put the first clutch C1 in the engagement state. In addition, the forward range pressure PD input to the second input port 52d is reversely input to the drain port SL2c of the second linear solenoid valve SL2 through the second output port 52g and supplied to the hydraulic servo 82 of the second clutch C2 to put the second clutch C2 in the engagement state. In addition, the non-forward range pressure PND input to the third input port 52e is reversely input to the drain port SL3c of the third linear solenoid valve SL3 through the third output port 52h and supplied to the hydraulic servo 83 of the second brake B2 to put the second brake B2 in the engagement state. In the embodiment, when the spool is present in the fail position, the line pressure PL is supplied to the drain port SL1c of the first linear solenoid valve SL1. However, the disclosure is not limited to the embodiment and a check valve or the like may be used for the forward range pressure PD and the non-forward range pressure PND to select the forward range pressure PD or the non-forward range pressure PND, whichever is higher, and the higher hydraulic pressure may be supplied to the drain port SL1c of the first linear solenoid valve SL1.

As described above, when the shift position is present in the forward travel range and the normal mode is entered, the range switching unit 53 switches the spool to the first position and performs self-holding and, when the shift position is present in the forward travel range and the all-off-fail mode is entered, the range switching unit 53 keeps the self-holding of the spool in the first position to supply a hydraulic pressure to the first clutch C1 and the second clutch C2 that form the forward third stage. In addition, when the shift position is present in the reverse travel range and the normal mode is entered, the range switching unit 53 switches the spool to the second position and, when the shift position is present in the reverse travel range and the all-off-fail mode is entered, the range switching unit 53 supplies a hydraulic pressure to the first clutch C1 and the second brake B2 that form the forward first stage.

In addition, when the spool is present in the first position, the range switching valve 51 outputs the holding pressure Plock for self-holding the spool and the forward range pressure PD and, when the spool is present in the second position, the range switching valve 51 outputs the non-forward range pressure PND. In addition, when the spool is present in the fail position, the fail-safe valve 52 supplies the line pressure PL to the first clutch C1, supplies the forward range pressure PD to the second clutch C2, and supplies the non-forward range pressure PND to the second brake B2.

Next, the operation of the hydraulic pressure control device 5 of the vehicle driving device 3 will be described.

When the internal combustion engine 2 is started, the original pressure supply unit 50 is operated and the line pressure PL and the modulator pressure Pmod are generated. The line pressure PL is supplied to the input port SL1a of the first linear solenoid valve SL1 and the input port SL3a of the third linear solenoid valve SL3.

When the shift position is switched from the parking (P) range or the neutral (N) range to the forward range, the ECU4 turns on the energization of the first signal solenoid valve SC1 and switches the spool of the range switching valve 51 to the first position using the first signal pressure PSC1. Accordingly, the line pressure PL supplied to the first input port 51d of the range switching valve 51 is output through the first output port 51f as the forward range pressure PD. In addition, since the modulator pressure Pmod supplied to the second input port 51e of the range switching valve 51 is output through the third output port 51h as the holding pressure Plock and supplied to the third working oil chamber 51c, the spool of the range switching valve 51 is self-held in the first position. Since the first signal pressure PSC1 is input to the second working oil chamber 52b in the fail-safe valve 52, the spool is locked in the normal position.

The forward range pressure PD output from the range switching valve 51 is supplied to the input port SL2a of the second linear solenoid valve SL2 and the input port SL4a of the fourth linear solenoid valve SL4. In addition, the drain port SL1c of the first linear solenoid valve SL1 communicates with the drain port 52i of the range switching valve 51, the drain port SL2c of the second linear solenoid valve SL2 communicates with the drain port 52j of the range switching valve 51, and the drain port SL3c of the third linear solenoid valve SL3 communicates with the drain port 52k of the range switching valve 51. Accordingly, since the engagement pressure is supplied to the input ports SL1a to SL4a of the first to fourth linear solenoid valves SL1 to SL4 when the shift position is present in the forward range, all of the first clutch C1, the second clutch C2, the first brake B1, and the second brake B2 are controllable and the forward first to fourth stages can be achieved by making engagement and release according to the engagement table in FIG. 2.

When the shift position is switched from the forward range to the neutral range or the parking range, the ECU4 turns off the energization of the first signal solenoid valve SC1 and turns on the energization of the second signal solenoid valve SC2. The second signal pressure PSC2 switches the spool to the second position against the holding pressure Plock self-holding the spool of the range switching valve 51 in the first position. Accordingly, the line pressure PL supplied to the first input port 51d of the range switching valve 51 is output through the second output port 51g as the non-forward range pressure PND. The non-forward range pressure PND output from the range switching valve 51 is blocked by the third input port 52e of the fail-safe valve 52. Although the line pressure PL is supplied to the input port SL1a of the first linear solenoid valve SL1 and the input port SL3a of the third linear solenoid valve SL3 at this time, the ECU4 can achieve the neutral range or the parking range by avoiding driving the second electric motor MG2 while engaging the first clutch C1 with the second brake B2 or by avoiding operating the linear solenoid valves SL1 and SL3.

When the shift position is switched from the parking range or the neutral range to the reverse range, the ECU4 outputs the engagement pressures PSL1 and PSL3 through the first linear solenoid valve SL1 and the third linear solenoid valve SL3 to engage the first clutch C1 with the second brake B2 and reversely rotates the second electric motor MG2. This reverses the power transmission path of the automatic transmission 7 to enable reverse travel.

Next, the operation in the all-off-fail mode will be described. When, for example, the electric wire for energizing all solenoid valves is broken during forward travel, for example, the first signal solenoid valve SC1, which is of normal close type, stops outputting the first signal pressure PSC1 and the linear solenoid valve SLT, which is of normal open type, outputs the SLT pressure PSLT. This switches the spool to the fail position in the fail-safe valve 52. Since the spool of the range switching valve 51 is self-held in the first position by the modulator pressure Pmod, even when the supply of the first signal pressure PSC1 stops, the spool is kept in the first position. Alternatively, even when the electric wire for energizing all solenoid valves is not broken, for example, if some solenoid valves fail and the ECU4 determines the execution of the same fail-safe processing as in the occurrence of an all-off-fail, the ECU4 outputs the SLT pressure PSLT of the linear solenoid valve SLT, stops outputting the first signal pressure PSC1, and switches the spool of the fail-safe valve 52 to the fail position.

When the spool of the fail-safe valve 52 is switched to the fail position, the line pressure PL is reversely input to the drain port SL1c of the first linear solenoid valve SL1 and the forward range pressure PD output since the spool of the range switching valve 51 is present in the first position is reversely input to the drain port SL2c of the second linear solenoid valve SL2. This puts the first clutch C1 and the second clutch C2 in the engagement state, obtains the forward third stage, and achieves the limp home function while preventing quick deceleration during forward travel.

After that, when the oil pump 30 is stopped and the modulator pressure Pmod is reduced since the internal combustion engine 2 is stopped or made ready off, the self-holding of the spool of the range switching valve 51 is released and the spool is switched to the second position. Then, when the vehicle 1 travels again by starting the internal combustion engine 2 again or making the internal combustion engine 2 ready on, the line pressure PL is reversely input to the drain port SL1c of the first linear solenoid valve SL1 and the non-forward range pressure PND output since the spool of the range switching valve 51 is present in the second position is reversely input to the drain port SL3c of the third linear solenoid valve SL3. This puts the first clutch C1 and the second brake B2 in the engagement state, obtains the forward first stage or the reverse stage, and achieves the limp home function. The ECU4 can cause the vehicle 1 to travel at the forward first stage by forward rotating the second electric motor MG2 when the shift position is present in the forward range and the ECU4 can cause the vehicle 1 to travel reversely by reversely rotating the second electric motor MG2 when the shift position is present in the reverse range.

In contrast, when, for example, the electric wire for energizing all solenoid valves is broken during reverse travel, the spool switches to the fail position in the fail-safe valve 52, as in the operation after the spool of the above range switching valve 51 is switched to the second position, the first clutch C1 and the second brake B2 are put in the engagement state and the limp home function can be achieved while the reverse stage is kept.

As described above, in the hydraulic pressure control device 5 of the vehicle driving device 3 according to the embodiment, the forward third stage is formed when the shift position is present in the forward travel range at the time of occurrence of an all-off-fail and the forward first stage is formed when the shift position is present in the reverse travel range. Accordingly, since the forward and reverse travel of the vehicle 1 is enabled at the forward first stage and high speed travel at the forward third stage, which is higher than the forward first stage, is enabled at the time of occurrence of an all-off-fail, the time necessary for evacuating the vehicle 1 can be reduced as compared with travel using only the forward first stage.

In addition, in the hydraulic pressure control device 5 of the vehicle driving device 3 according to the embodiment, since the forward third stage is formed if the fail-safe valve 52 is present in the fail position when the range switching valve 51 is present in the first position, it is possible to suppress quick deceleration when the all-off-fail mode is entered during forward travel. In addition, since the forward first stage or the reverse stage is formed if the fail-safe valve 52 is present in the fail position when the range switching valve 51 is present in the second position, it is possible to obtain forward travel by forward rotating the second electric motor MG2 and obtain reverse travel by reversely rotating the second electric motor MG2. This achieves reverse travel as well as forward travel when all solenoid valves are in the all-off-fail mode.

In addition, in the hydraulic pressure control device 5 of the vehicle driving device 3 according to the embodiment, the range switching valve 51 supplies the forward range pressure PD to the linear solenoid valves SL2 and SL4 other than the first linear solenoid valve SL1 and the third linear solenoid valve SL3 in the first position to achieve the transmission shift stages (2nd, 3rd, and 4th) other than the forward first stage. Accordingly, when the range switching valve 51 is present in the second position, the forward range pressure PD is not supplied to the linear solenoid valves SL2 and SL4 and the engagement pressures PSL2 and PSL4 are not supplied to the second clutch C2 and the first brake B1. Accordingly, it is possible to prevent the engagement of the second clutch C2 or the first brake B1 in the forward first stage or the reverse stage when an on-fail occurs in a single fail in the second linear solenoid valve SL2 or the fourth linear solenoid valve SL4.

In addition, in the hydraulic pressure control device 5 of the vehicle driving device 3 according to the embodiment, in the fail position, the fail-safe valve 52 supplies the line pressure PL to the hydraulic servo 81 of the first clutch C1 by supplying the line pressure PL to the drain port SL1c of the first linear solenoid valve SL1, supplies the forward range pressure PD to the hydraulic servo 82 of the second clutch C2 by supplying the forward range pressure PD to the drain port SL2c of the second linear solenoid valve SL2, and supplies the non-forward range pressure PND to the hydraulic servo 83 of the second brake B2 by supplying the non-forward range pressure PND to the drain port SL3c of the third linear solenoid valve SL3. This can reduce the length of the fail-safe valve 52 as compared with the case in which the fail-safe valve 52 switches the oil path to directly supply the hydraulic pressure to the hydraulic servos 81, 82, and 83 without passing through the linear solenoid valves SL1, SL2, and SL3 during fail-safe.

In the embodiment, the vehicle driving device 3 includes the first electric motor MG1 and the power distribution mechanism 6 that transfers the driving force of the output shaft 20 of the internal combustion engine 2 while distributing the driving force among the rotary shaft 10 of the first electric motor MG1 and the input member 70. Accordingly, the vehicle driving device 3 is applicable to a split type hybrid vehicle including the first electric motor MG, the second electric motor MG2, the internal combustion engine 2, and the power distribution mechanism 6.

In addition, in the hydraulic pressure control device 5 of the vehicle driving device 3 according to the embodiment, the automatic transmission 7 includes the case 74, the planetary gear unit PU having a first rotary element, a second rotary element, a third rotary element, and a fourth rotary element in accordance with an order in which the first to fourth rotary elements are arranged in a velocity diagram, the first clutch C1, which is the first engagement element, the second clutch C2, which is the second engagement element, the first brake B1, which is one of the plurality of engagement elements, and the second brake B2, which is the third engagement element, and the one-way clutch F1, and wherein the second rotary element is coupled to the output member 73, the first clutch C1 is capable of engaging the input member 70 with the first rotary element, the second clutch C2 is capable of engaging the input member 70 with the third rotary element, the first brake B1 is capable of locking the case 74 with the fourth rotary element, the second brake B2 is capable of locking the case 74 with the third rotary element, the one-way clutch F1 is engaged in a reversed rotational direction of the third rotary element with respect to the case 74, a forward first stage (first stage) is achieved by engaging the first clutch C1 with the one-way clutch F1 or the second brake B2, a forward second stage (second stage) is achieved by engaging the first clutch C1 with the first brake B1, a forward third stage (third stage), which is a middle-high transmission shift stage, is achieved by engaging the first clutch C1 with the second clutch C2, and a forward fourth stage is achieved by engaging the second clutch C2 with the first brake B1. Accordingly, the automatic transmission 7 at the forward fourth stage can be achieved in a relatively simple structure including four rotary elements, two clutches, two brakes, and one one-way clutch.

In addition, the hydraulic pressure control device 5 of the vehicle driving device 3 according to the embodiment has the second signal solenoid valve SC2 capable of supplying the second signal pressure PSC2 capable of pushing the spool of the range switching valve 51 of the range switching unit 53 to the second position. Accordingly, when the shift position is switched from the forward range to the neutral range or the parking range, it is possible to make switching to the second position by forcibly releasing self-holding in the first position of the switching valve 51 by the modulator pressure Pmod.

Although the hydraulic pressure is supplied to the hydraulic servos 81, 82, and 83 by reversely inputting the hydraulic pressure to the drain ports SL1c, SL2c, and SL3c of the linear solenoid valves SL11, SL2, and SL3 during fail-safe in the above embodiment, the disclosure is not limited to the embodiment. For example, the hydraulic pressure may be directly supplied to the hydraulic servos 81, 82, and 83 without passing through the linear solenoid valves SL1, SL2, and SL3 during fail-safe.

In addition, although the range switching valve 51 supplies the forward range pressure PD to the linear solenoid valves SL2 and SL4 in the first position in the above embodiment, the disclosure is not limited to the embodiment. For example, the line pressure PL may be always supplied to the linear solenoid valves SL2 and SL4. In this case, the oil path can be simplified.

In addition, although the vehicle driving device 3 is applied to a split type hybrid vehicle in the embodiment described above, the disclosure is not limited to the embodiment. For example, the vehicle driving device 3 may be applied to a parallel type hybrid vehicle or an electric vehicle.

Second Embodiment

Figure 5:
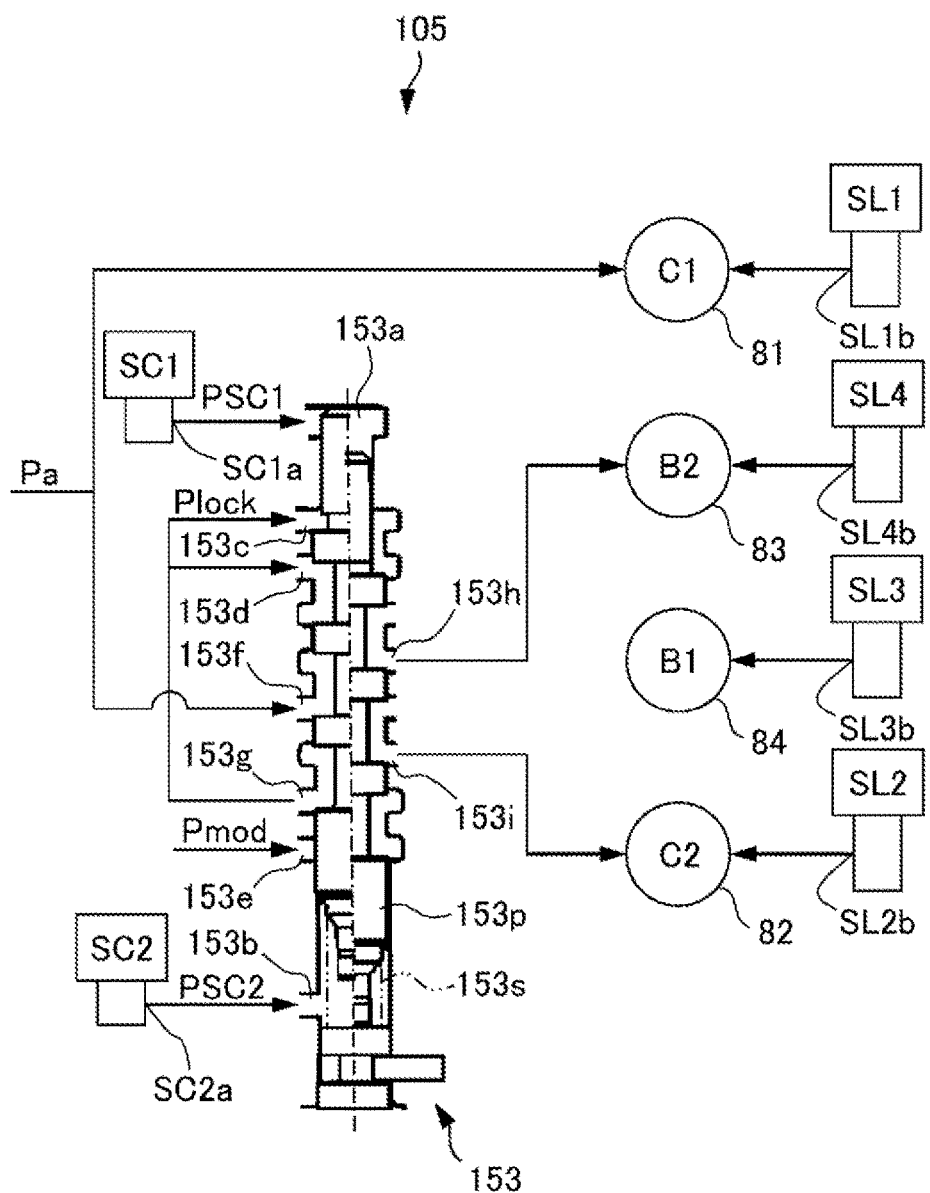
FIG. 5 is an explanatory diagram illustrating a hydraulic pressure control device according to a second embodiment.

Next, a hydraulic pressure control device 105 according to the second embodiment will be described with reference to FIG. 5. Since the structure of the vehicle driving device 3 to which the hydraulic pressure control device 105 according to the embodiment is applied is similar to that of the first embodiment, detailed descriptions are omitted.

The hydraulic pressure control device 105 includes an original pressure supply unit (not illustrated), the first linear solenoid valve SL1, the second linear solenoid valve SL2, the third linear solenoid valve SL3, the fourth linear solenoid valve SL4, the first signal solenoid valve SC1, the second signal solenoid valve SC2, and a range switching valve (range switching unit) 153. Since the line pressure PL is input to the linear solenoid valves SL1, SL2, SL3, and SL4, the engagement pressure can be output regardless of the operation of the range switching valve 153. Since the signal solenoid valves SC1 and SC2 are similar to those of the first embodiment, detailed descriptions are omitted.

The original pressure supply unit adjusts the hydraulic pressure supplied from the oil pump 30 (see FIG. 4) based on the throttle opening using a primary regulator valve (not illustrated), secondary regulator valve (not illustrated), modulator valve (not illustrated), and the like to the line pressure PL and the modulator pressure (first original pressure) Pmod. In addition, the original pressure supply unit outputs the modulator pressure Pmod as the first original pressure in the normal mode and the all-off-fail mode and outputs a second original pressure Pa only in the all-off-fail mode. The second original pressure Pa can be supplied to the hydraulic servo 81 of the first clutch C1.

The range switching valve 153 includes a spool 153p capable of making switching between the first position, which is the right-half position in the drawing, and the second position, which is the left-half position in the drawing, and a spring (biasing member) 153s having a compression coil spring biasing the spool to the second position. The range switching valve 153 includes a first working oil chamber 153a, a second working oil chamber 153b, and a third working oil chamber 153c. The first working oil chamber 153a inputs the first signal pressure PSC1 in a direction in which the spool 153p is pushed to the first position, the second working oil chamber 153b inputs the second signal pressure PSC2 in a direction in which the spool 153p is pushed to the second position, and the third working oil chamber 153c inputs the holding pressure Plock in a direction in which the diameter difference portion of the spool 153p is pushed to the first position. Accordingly, the spool 153p is pushed to the second position when the first signal solenoid valve SC1 is not energized.

The range switching valve 153 includes a first input port 153d communicating with a first output port 153g, a second input port 153e to which the modulator pressure Pmod is input, and a second input port 153f to which the second original pressure Pa is input. In addition, the range switching valve 153 includes the first output port 153g communicating with the third working oil chamber 153c and the first input port 153d, a second output port 153h communicating with the hydraulic servo 83 of the second brake B2, and a third output port 153i communicating with the hydraulic servo 82 of the second clutch C2.

In the range switching valve 153, when the spool 153p is present in the first position, the first input port 153d communicates with the third working oil chamber 153c, the second input port 153e communicates with the first output port 153g, and the third input port 153f communicates with the third output port 153i. At this time, since the modulator pressure Pmod supplied to the second input port 153e is output through the first output port 153g and supplied to the third working oil chamber 153c as the holding pressure Plock, the spool 153p is self-held in the first position. When the second signal pressure PSC2 is supplied during self-holding or when the oil pump 30 is stopped and the supply of the modulator pressure Pmod is stopped, the self-holding is released and switching to the second position is made. In addition, the second original pressure Pa supplied to the third input port 153f in the all-off-fail mode is output through the third output port 153i.

In the range switching valve 153, when the spool 153p is present in the second position, the second input port 153e is blocked and the third input port 153f communicates with the second output port 153h. At this time, the second original pressure Pa supplied to the third input port 153f in the all-off-fail mode is output through the second output port 153h.

In the embodiment, the range switching valve 153 can supply the hydraulic pressure to the hydraulic servos 82 and 83 without passing through the linear solenoid valves SL2 and SL4. These linear solenoid valves SL2 and SL4 are closed in the all-off-fail mode.

As described above, when the shift position is present in the forward travel range and the normal mode is entered, the range switching valve 153 according to the embodiment switches the spool 153p to the first position and self-holds the spool 153p with the modulator pressure Pmod. In addition, when the shift position is present in the forward travel range and the all-off-fail mode is entered, the range switching valve 153 keeps on self-holding the spool 153p in the first position with the modulator pressure Pmod and supplies the second original pressure Pa to the second clutch C2 forming the forward third stage. In addition, when the shift position is present in the reverse travel range and the all-off-fail mode is entered, the range switching valve 153 supplies the second original pressure Pa to the second brake B2 forming the forward first stage.

Next, the operation of the hydraulic pressure control device 105 according to the embodiment will be described.

When the internal combustion engine 2 is started, the original pressure supply unit is operated and the modulator pressure Pmod is generated. When the shift position is switched from the parking range or the neutral range to the forward range, the ECU4 turns on the energization of the first signal solenoid valve SC1 and switches the spool 153p of the range switching valve 153 to the first position using the first signal pressure PSC1. The spool 153p is self-held in the first position by the holding pressure Plock based on the modulator pressure Pmod. Since the linear solenoid valves SL1, SL2, SL3, and SL4 are operated as appropriate and all of the first clutch C1, the second clutch C2, the first brake B1, and the second brake B2 become controllable and the forward first to fourth transmission shift stages can be achieved by making engagement and release as illustrated in the engagement table in FIG. 2.

When the shift position is switched from the forward range to the neutral range or the parking range, the ECU4 turns off the energization of the first signal solenoid valve SC and turns on the energization of the second signal solenoid valve SC2. The second signal pressure PSC2 switches the spool 153p of the range switching valve 51 to the second position against the holding pressure Plock self-holding the spool 153p in the first position.

When the shift position is switched from the parking range or the neutral range to the reverse range, the ECU4 outputs the engagement pressures PSL1 and PSL3 through the first linear solenoid valve SL1 and the third linear solenoid valve SL3 to engage the first clutch C1 with the second brake B2 and reversely rotates the second electric motor MG2. This reverses the power transmission path of the automatic transmission 7 to enable reverse travel.

Next, the operation in the all-off-fail mode will be described. For example, when the electric wire for energizing all solenoid valves is broken during forward travel, for example, the first signal solenoid valve SC1, which is of normal close type, stops outputting the first signal pressure PSC1. Since the spool 153p of the range switching valve 153 is self-held in the first position by the modulator pressure Pmod at this time, the spool 153p is kept in the first position even when the supply of the first signal pressure PSC1 is stopped. Alternatively, even when the electric wire for energizing all solenoid valves is not broken, for example, if some solenoid valves fail and the ECU4 determines the execution of the same fail-safe processing as in the occurrence of an all-off-fail, the ECU4 stops outputting the first signal pressure PSC1.

When switching to the all-off-fail mode is made, the second original pressure Pa is output. The second original pressure Pa is directly supplied to the hydraulic servo 81 of the first clutch C1 and supplied to the hydraulic servo 82 of the second clutch C2 via the range switching valve 153. This puts the first clutch C1 and the second clutch C2 in the engagement state, obtains the forward third stage, and achieves the limp home function while preventing quick deceleration during forward travel.

After that, when the oil pump 30 is stopped and the modulator pressure Pmod is reduced since the internal combustion engine 2 is stopped or made ready off, the self-holding of the spool 153p of the range switching valve 153 is released and the spool 153p is switched to the second position. Then, when the vehicle 1 travels again by starting the internal combustion engine 2 or making the internal combustion engine 2 ready on again, the second original pressure Pa is directly supplied to the hydraulic servo 81 of the first clutch C1 and supplied to the hydraulic servo 83 of the second brake B2 via the range switching valve 153. This puts the first clutch C1 and the second brake B2 in the engagement state, obtains the forward first stage or the reverse stage, and achieves the limp home function. The ECU4 can cause the vehicle 1 to travel at the forward first stage by forward rotating the second electric motor MG2 when the shift position is present in the forward range and the ECU4 can cause the vehicle 1 to travel reversely by reversely rotating the second electric motor MG2 when the shift position is present in the reverse range.

In contrast, when, for example, the electric wire for energizing all solenoid valves is broken during reverse travel, the second original pressure Pa is output, the first clutch C1 and the second brake B2 are put in the engagement state as in the operation after the above spool 153p is switched to the second position, and the limp home function can be achieved while the reverse stage is kept.

As described above, the forward and reverse travel of the vehicle 1 is enabled at the forward first stage and high speed travel at the forward third stage, which is higher than the forward first stage, is enabled at the time of occurrence of an all-off-fail in the hydraulic pressure control device 105 according to the embodiment, so the time necessary for evacuating the vehicle 1 can be reduced as compared with travel using only the forward first stage.

In addition, since the second original pressure Pa is supplied to the necessary hydraulic servos 81, 82, and 83 without passing through the linear solenoid valves SL1, SL2, and SL4 in the all-off-fail mode in the hydraulic pressure control device 105 according to the embodiment, the hydraulic circuit can be simplified.

Although the range switching valve 153 supplies the hydraulic pressure to the hydraulic servos 82 and 83 without passing through the linear solenoid valves SL2 and SL4 in the above embodiment, the disclosure is not limited to the embodiment. For example, the range switching valve 153 may supply the hydraulic pressure to the hydraulic servos 82 and 83 by supplying the hydraulic pressure to the drain ports of the linear solenoid valves SL2 and SL4.

The first and second embodiments described above have at least the following structures. There is provided a hydraulic pressure control device (5) of a vehicle driving device (3) according to the embodiments including a rotary electric machine (MG2) capable of switching a rotational direction of a driving force to be output between forward and reverse directions, an input member (70) coupled to the rotary electric machine (MG2), an output member (73) coupled to a wheel (8), an oil pump (30) supplying a hydraulic pressure, and an automatic transmission (7) disposed in a power transmission path between the input member (70) and the output member (73), the automatic transmission (7) having a plurality of engagement elements (C1, C2, B1, B2) engaged or released by supplying or draining the hydraulic pressure through control of solenoid valves, the automatic transmission (7) forming a first transmission shift stage or a second transmission shift stage slower than the first transmission shift stage by combining the engagement elements to be engaged or released, the automatic transmission (7) disallowing a reverse rotation output of the rotary electric machine (MG2) at the first transmission shift stage, in which reverse travel of a vehicle (1) is achieved by reversely rotating the rotary electric machine (MG2) while forming the second transmission shift stage, the hydraulic pressure control device (5) characterized by including a range switching unit (53, 153) having a first signal solenoid valve (SC1) capable of supplying a first signal pressure (PSC1) and a spool switchable between a first position reached via the first signal pressure (PSC1) and a second position reached via a biasing force of a biasing member (51s), in which the range switching unit (53, 153) switches the spool to the first position and self-holds the spool when a shift position is present in a forward travel range and a normal mode is entered, the range switching unit (53, 153) keeps on self-holding the spool in the first position and supplies a hydraulic pressure to the engagement elements (C1 and C2) forming the first transmission shift stage when the shift position is present in the forward travel range and an all-off-fail mode in which no solenoid valves are energized is entered, the range switching unit (53, 153) switches the spool to the second position when the shift position is present in a reverse travel range and the normal mode is entered, and the range switching unit (53, 153) supplies the hydraulic pressure to the engagement elements (C1, B2) forming the second transmission shift stage when the shift position is present in the reverse travel range and the all-off-fail mode is entered. In this structure, the first transmission shift stage is formed when the shift position is present in the forward travel range at the time of occurrence of an all-off-fail and the second transmission shift stage is formed when the shift position is present in the reverse travel range. Therefore, since the forward and reverse travel of the vehicle (1) is enabled at the second transmission shift stage and high speed travel at the first transmission shift stage, which is higher than the second transmission shift stage, is enabled at the time of occurrence of an all-off-fail, the time necessary for evacuating the vehicle (1) can be reduced as compared with travel using only the second transmission shift stage.

In addition, in the hydraulic pressure control device (5) of the vehicle driving device (3) according to the first embodiment, the automatic transmission (7) includes a first engagement element (C1), a second engagement element (C2), and a third engagement element (B2) as the plurality of engagement elements, the first engagement element (C1) is engaged with the second engagement element (C2) to form the first transmission shift stage and the first engagement element (C1) is engaged with the third engagement element (B2) to form the second transmission shift stage, the solenoid valves include a first solenoid valve (SL1), a second solenoid valve (SL2), and a third solenoid valve (SL3), the first solenoid valve (SL1) being capable of engaging or releasing the first engagement element (C1) by supplying the hydraulic pressure to or draining the hydraulic pressure from the first engagement element (C1), the first solenoid valve (SL) always receiving an original pressure (PL) from the oil pump (30), the second solenoid valve (SL2) being capable of engaging or releasing the second engagement element (C2) by supplying the hydraulic pressure to or draining the hydraulic pressure from the second engagement element (C2), the third solenoid valve (SL3) being capable of engaging or releasing the third engagement element (B2) by supplying the hydraulic pressure to or draining the hydraulic pressure from the third engagement element (B2), the third engagement element (B2) always receiving the original pressure (PL), and the range switching unit (53) has a first switching valve (51) that includes a first spool as the spool, outputs a holding pressure (Plock) for self-holding the first spool and a first hydraulic pressure (PD) when the first spool is present in the first position, and outputs a second hydraulic pressure (PND) when the first spool is present in the second position and a second switching valve (52) that has a second spool switchable between a normal position reached in the normal mode and a fail position reached in the all-off-fail mode and, when the second spool is present in the fail position, supplies one of the first hydraulic pressure (PD), the second hydraulic pressure (PND), and the original pressure (PL) to the first engagement element (C1), supplies the first hydraulic pressure (PD) to the second engagement element (C2), and supplies the second hydraulic pressure (PND) to the third engagement element (B2). In this structure, since the first transmission shift stage is formed if the second switching valve (52) is present in the fail position when the first switching valve (51) is present in the first position, it is possible to suppress quick deceleration when the all-off-fail mode is entered during forward travel. In addition, since the second transmission shift stage is formed if the second switching valve (52) is present in the fail position when the first switching valve (51) is present in the second position, it is possible to enable forward travel by forward rotating the rotary electric machine (MG2) and enable reverse travel by reversely rotating the rotary electric machine (MG2). This achieves reverse travel as well as forward travel when all solenoid valves are in the all-off-fail mode.

In addition, in the hydraulic pressure control device (5) of the vehicle driving device (3) according to the first embodiment, the first switching valve (51) supplies, in the first position, the first hydraulic pressure (PD) to the solenoid valves (SL2 and SL4) other than the first solenoid valve (SL) and the third solenoid valve (SL3) to enable achievement of the transmission shift stages other than the second transmission shift stage. In this structure, the first hydraulic pressure (PD) is not supplied to the solenoid valves (SL2 and SL4) other than the first solenoid valve (SL1) and the third solenoid valve (SL3) when the first switching valve (51) is present in the second position, so it is possible to prevent engagement of the solenoid valves (SL2 and SL4) other than the first solenoid valve (SL1) and the third solenoid valve (SL3) at the first transmission shift stage when an on-fail occurs in a single fail.

In addition, in the hydraulic pressure control device (5) of the vehicle driving device (3) according to the first embodiment, when the second spool is present in the fail position, the second switching valve (52) supplies the original pressure (PL) to a hydraulic servo (81) of the first engagement element (C1) by supplying the original pressure (PL) to a drain port (SL1c) of the first solenoid valve (SL1), supplies the first hydraulic pressure (PD) to a hydraulic servo (82) of the second engagement element (C2) by supplying the first hydraulic pressure (PD) to a drain port (SL2c) of the second solenoid valve (SL2), and supplies the second hydraulic pressure (PND) to a hydraulic servo (83) of the third engagement element (B2) by supplying the second hydraulic pressure (PND) to a drain port (SL3c) of the third solenoid valve (SL3). In this structure, the length of the second switching valve (52) can be reduced as compared with the case in which the second switching valve (52) switches the oil path to directly supply the hydraulic pressure to the hydraulic servos (81, 82, and 83) without passing through the solenoid valves (SL1, SL2, and SL3) during fail-safe.

In addition, in the hydraulic pressure control device (5) of the vehicle driving device (3) according to the second embodiment, the range switching unit (153) is a range switching valve that switches the spool to the first position and self-holds the spool at the first original pressure (Pmod) supplied from the oil pump (30) when the shift position is present in the forward travel range and the normal mode is entered, keeps on self-holding the spool in the first position at the first original pressure (Pmod) and supplies a second original pressure (Pa) supplied from the oil pump (30) to the engagement elements (C1, C2) forming the first transmission shift stage when the shift position is present in the forward travel range and the all-off-fail mode is entered, and supplies the second original pressure (Pa) to the engagement elements (C1, B2) forming the second transmission shift stage when the shift position is present in the reverse travel range and the all-off-fail mode is entered. In this structure, the range switching unit (153) can be configured by a single valve to simplify the range switching unit (153).

In addition, in the hydraulic pressure control device (5) of the vehicle driving device (3) according to the second embodiment, the range switching valve is capable of supplying a hydraulic pressure to hydraulic servos (81, 82, 83, 84) of the engagement elements without passing through the solenoid valves (SL, SL2, SL3, and SL4). In this structure, the hydraulic circuit can be simplified.

In addition, in the hydraulic pressure control device (5) of the vehicle driving device (3) according to the second embodiment, the range switching valve is capable of supplying the hydraulic pressure to the hydraulic servos (81, 82, 83, 84) of the engagement elements by supplying the hydraulic pressure to drain ports of the solenoid valves (SL1, SL2, SL3, SL4). In this structure, the flexibility in designing the hydraulic circuit can be improved.

In addition, in the hydraulic pressure control device (5) of the vehicle driving device (3) according to the embodiments, the vehicle driving device (3) includes an electric generator (MG1) and a power distribution mechanism (6) that transfers a driving force of an output shaft of an internal combustion engine (2) while distributing the driving force among a rotary shaft of the electric generator (MG1) and the input member (70). In this structure, the vehicle driving device (3) is applicable to a so-called split type hybrid vehicle including the electric generator (MG1), the rotary electric machine (MG2), the internal combustion engine (2), and the power distribution mechanism (6).

In addition, in the hydraulic pressure control device (5) of the vehicle driving device (3) according to the embodiments, the automatic transmission (7) includes a case (74), a planetary gear unit (PU) having a first rotary element (S2), a second rotary element (R1), a third rotary element (R2), and a fourth rotary element (S1) in accordance with an order in which the first to fourth rotary elements (S2, R1, R2, S1) are arranged in a velocity diagram, a first clutch (C1) as the first engagement element (C1), which is one of the plurality of engagement elements, a second clutch (C2) as the second engagement element (C2), which is one of the plurality of engagement elements, a first brake (B1), which is one of the plurality of engagement elements, a second brake (B2) as the third engagement element (B2), which is one of the plurality of engagement elements, and a one-way clutch (F1), and in which the second rotary element (R1) is coupled to the output member (73), the first clutch (C1) is capable of engaging the input member (70) with the first rotary element (S2), the second clutch (C2) is capable of engaging the input member (70) with the third rotary element (R2), the first brake (B1) is capable of locking the case (74) with the fourth rotary element (S1), the second brake (B2) is capable of locking the case (74) with the third rotary element (R2), the one-way clutch (F1) is engaged in a reversed rotational direction of the third rotary element (R2) with respect to the case (74), a first stage, which is the second transmission shift stage, is achieved by engaging the first clutch (C1) with the one-way clutch (F1) or the second brake (B2), a second stage is achieved by engaging the first clutch (C1) with the first brake (B1), a third stage, which is the first transmission shift stage, is achieved by engaging the first clutch (C1) with the second clutch (C2), and a fourth stage is achieved by engaging the second clutch (C2) with the first brake (B1). In this structure, it is possible to achieve the automatic transmission (7) at the forward fourth stage in a relatively simple structure including the four rotary elements (S2, R1, R2, S1), the two clutches (C1, C2), the two brakes (B1, B2), and the one one-way clutch (F1).

In addition, the hydraulic pressure control device (5) of the vehicle driving device (3) according to the embodiments further includes the second signal solenoid valve (SC2) capable of supplying the second signal pressure (PSC2) capable of pushing the spool of the range switching unit (53, 153) to the second position. In this structure, when the shift position is switched from the forward range to the neutral range or the parking range, self-holding in the first position by the range switching unit (53, 153) using the first original pressure (Pmod) is forcibly released to enable switching to the second position.

INDUSTRIAL APPLICABILITY

The hydraulic pressure control device of the vehicle driving device relates to the hydraulic pressure control device of a vehicle driving device mounted in, for example, a vehicle. More particularly, the hydraulic pressure control device is preferably used as a hydraulic pressure control device of a vehicle driving device having a rotary electric machine and a fail-safe mechanism.

The invention claimed is:
1. A hydraulic pressure control device of a vehicle driving device, the hydraulic pressure control device comprising:
   a rotary electric machine capable of switching a rotational direction of a driving force to be output between forward and reverse directions;
   an input coupled to the rotary electric machine;
   an output coupled to a wheel;
   an oil pump supplying a hydraulic pressure;
   an automatic transmission disposed in a power transmission path between the input and the output, the automatic transmission having a plurality of engagement elements engaged or released by supplying or draining the hydraulic pressure through control of solenoid valves, the automatic transmission forming a first transmission shift stage or a second transmission shift stage slower than the first transmission shift stage by combining the engagement elements to be engaged or released, the automatic transmission disallowing a reverse rotation output of the rotary electric machine at the first transmission shift stage, wherein reverse travel of a vehicle is achieved by reversely rotating the rotary electric machine while forming the second transmission shift stage; and
   a range switcher having a first signal solenoid valve capable of supplying a first signal pressure and a spool switchable between a first position reached via the first signal pressure and a second position reached via a biasing force of a biasing member, wherein:
      the range switcher switches the spool to the first position and self-holds the spool when a shift position is present in a forward travel range and a normal mode is entered,
      the range switcher keeps on self-holding the spool in the first position and supplies the hydraulic pressure to the engagement elements forming the first transmission shift stage when the shift position is present in the forward travel range and an all-off-fail mode in which no solenoid valves are energized is entered,
      the range switcher switches the spool to the second position when the shift position is present in a reverse travel range and the normal mode is entered, and
      the range switcher supplies the hydraulic pressure to the engagement elements forming the second transmission shift stage when the shift position is present in the reverse travel range and the all-off-fail mode is entered.

2. The hydraulic pressure control device of a vehicle driving device according to claim 1, wherein:
   the automatic transmission includes a first engagement element, a second engagement element, and a third engagement element as the plurality of engagement elements,
   the first engagement element is engaged with the second engagement element to form the first transmission shift stage and the first engagement element is engaged with the third engagement element to form the second transmission shift stage,
   the solenoid valves include a first solenoid valve, a second solenoid valve, and a third solenoid valve, the first solenoid valve being capable of engaging or releasing the first engagement element by supplying the hydraulic pressure to or draining the hydraulic pressure from the first engagement element, the first solenoid valve always receiving an original pressure from the oil pump, the second solenoid valve being capable of engaging or releasing the second engagement element by supplying the hydraulic pressure to or draining the hydraulic pressure from the second engagement element, the third solenoid valve being capable of engaging or releasing the third engagement element by supplying the hydraulic pressure to or draining the hydraulic pressure from the third engagement element, the third engagement element always receiving the original pressure, the range switcher has a first switching valve that includes a first spool as the spool, outputs a holding pressure for self-holding the first spool and a first hydraulic pressure when the first spool is present in the first position, and outputs a second hydraulic pressure when the first spool is present in the second position, and a second switching valve that has a second spool switchable between a normal position reached in the normal mode and a fail position reached in the all-off-fail mode and, when the second spool is present in the fail position, supplies one of the first hydraulic pressure, the second hydraulic pressure, and the original pressure to the first engagement element, supplies the first hydraulic pressure to the second engagement element, and supplies the second hydraulic pressure to the third engagement element.

3. The hydraulic pressure control device of a vehicle driving device according to claim 2, wherein the first switching valve supplies, in the first position, the first hydraulic pressure to the solenoid valves other than the first solenoid valve and the third solenoid valve to enable achievement of the transmission shift stages other than the second transmission shift stage.

4. The hydraulic pressure control device of a vehicle driving device according to claim 3, wherein, when the second spool is present in the fail position, the second switching valve supplies the original pressure to a hydraulic servo of the first engagement element by supplying the original pressure to a drain port of the first solenoid valve, supplies the first hydraulic pressure to a hydraulic servo of the second engagement element by supplying the first hydraulic pressure to a drain port of the second solenoid valve, and supplies the second hydraulic pressure to a hydraulic servo of the third engagement element by supplying the second hydraulic pressure to a drain port of the third solenoid valve.

5. The hydraulic pressure control device of a vehicle driving device according to claim 4, wherein the vehicle driving device includes an electric generator and a power distribution mechanism that transfers a driving force of an output shaft of an internal combustion engine while distributing the driving force among a rotary shaft of the electric generator and the input.

6. The hydraulic pressure control device of a vehicle driving device according to claim 5, wherein:
the automatic transmission includes:
a case,
a planetary gear unit having a first rotary element, a second rotary element, a third rotary element, and a fourth rotary element in accordance with an order in which the first to fourth rotary elements are arranged in a velocity diagram,
a first clutch as the first engagement element, which is one of the plurality of engagement elements,
a second clutch as the second engagement element, which is one of the plurality of engagement elements,
a first brake, which is one of the plurality of engagement elements,
a second brake as the third engagement element, which is one of the plurality of engagement elements, and
a one-way clutch,
the second rotary element is coupled to the output, the first clutch is capable of engaging the input with the first rotary element,
the second clutch is capable of engaging the input with the third rotary element,
the first brake is capable of locking the case with the fourth rotary element,
the second brake is capable of locking the case with the third rotary element,
the one-way clutch is engaged in a reversed rotational direction of the third rotary element with respect to the case, and
a first stage, which is the second transmission shift stage, is achieved by engaging the first clutch with the one-way clutch or the second brake, a second stage is achieved by engaging the first clutch with the first brake, a third stage, which is the first transmission shift stage, is achieved by engaging the first clutch with the second clutch, and a fourth stage is achieved by engaging the second clutch with the first brake.

7. The hydraulic pressure control device of a vehicle driving device according to claim 6, further comprising:
a second signal solenoid valve capable of supplying a second signal pressure capable of pushing the spool of the range switcher to the second position.

8. The hydraulic pressure control device of a vehicle driving device according to claim 1, wherein the range switcher is a range switching valve that:
switches the spool to the first position and self-holds the spool at the first original pressure supplied from the oil pump when the shift position is present in the forward travel range and the normal mode is entered,
keeps on self-holding the spool in the first position at the first original pressure and supplies a second original pressure supplied from the oil pump to the engagement elements forming the first transmission shift stage when the shift position is present in the forward travel range and the all-off-fail mode is entered, and
supplies the second original pressure to the engagement elements forming the second transmission shift stage when the shift position is present in the reverse travel range and the all-off-fail mode is entered.

9. The hydraulic pressure control device of a vehicle driving device according to claim 8, wherein the range switching valve is capable of supplying the hydraulic pressure to hydraulic servos of the engagement elements without passing through the solenoid valves.

10. The hydraulic pressure control device of a vehicle driving device according to claim 9, wherein the range switching valve is capable of supplying the hydraulic pressure to the hydraulic servos of the engagement elements by supplying the hydraulic pressure to drain ports of the solenoid valves.

11. The hydraulic pressure control device of a vehicle driving device according to claim 10, wherein the vehicle driving device includes an electric generator and a power distribution mechanism that transfers a driving force of an output shaft of an internal combustion engine while distributing the driving force among a rotary shaft of the electric generator and the input.

12. The hydraulic pressure control device of a vehicle driving device according to claim 11, wherein:
the automatic transmission includes:
a case,
a planetary gear unit having a first rotary element, a second rotary element, a third rotary element, and a fourth rotary element in accordance with an order in which the first to fourth rotary elements are arranged in a velocity diagram,
a first clutch as the first engagement element, which is one of the plurality of engagement elements,
a second clutch as the second engagement element, which is one of the plurality of engagement elements,
a first brake, which is one of the plurality of engagement elements,
a second brake as the third engagement element, which is one of the plurality of engagement elements, and
a one-way clutch,
the second rotary element is coupled to the output,
the first clutch is capable of engaging the input with the first rotary element,
the second clutch is capable of engaging the input with the third rotary element,
the first brake is capable of locking the case with the fourth rotary element,
the second brake is capable of locking the case with the third rotary element,
the one-way clutch is engaged in a reversed rotational direction of the third rotary element with respect to the case, and
a first stage, which is the second transmission shift stage, is achieved by engaging the first clutch with the one-way clutch or the second brake, a second stage is achieved by engaging the first clutch with the first brake, a third stage, which is the first transmission shift stage, is achieved by engaging the first clutch with the second clutch, and a fourth stage is achieved by engaging the second clutch with the first brake.

13. The hydraulic pressure control device of a vehicle driving device according to claim 12, further comprising:
a second signal solenoid valve capable of supplying a second signal pressure capable of pushing the spool of the range switcher to the second position.

14. The hydraulic pressure control device of a vehicle driving device according to claim 1, wherein the vehicle driving device includes an electric generator and a power distribution mechanism that transfers a driving force of an output shaft of an internal combustion engine while distributing the driving force among a rotary shaft of the electric generator and the input.

15. The hydraulic pressure control device of a vehicle driving device according to claim 14, wherein:
the automatic transmission includes:
a case,
a planetary gear unit having a first rotary element, a second rotary element, a third rotary element, and a fourth rotary element in accordance with an order in which the first to fourth rotary elements are arranged in a velocity diagram,
a first clutch as the first engagement element, which is one of the plurality of engagement elements,
a second clutch as the second engagement element, which is one of the plurality of engagement elements,
a first brake, which is one of the plurality of engagement elements,
a second brake as the third engagement element, which is one of the plurality of engagement elements, and
a one-way clutch,
the second rotary element is coupled to the output,
the first clutch is capable of engaging the input with the first rotary element,
the second clutch is capable of engaging the input with the third rotary element,
the first brake is capable of locking the case with the fourth rotary element,
the second brake is capable of locking the case with the third rotary element,
the one-way clutch is engaged in a reversed rotational direction of the third rotary element with respect to the case, and
a first stage, which is the second transmission shift stage, is achieved by engaging the first clutch with the one-way clutch or the second brake, a second stage is achieved by engaging the first clutch with the first brake, a third stage, which is the first transmission shift stage, is achieved by engaging the first clutch with the second clutch, and a fourth stage is achieved by engaging the second clutch with the first brake.

16. The hydraulic pressure control device of a vehicle driving device according to claim 15, further comprising:
a second signal solenoid valve capable of supplying a second signal pressure capable of pushing the spool of the range switcher to the second position.

17. The hydraulic pressure control device of a vehicle driving device according to claim 1, wherein:
the automatic transmission includes:
a case,
a planetary gear unit having a first rotary element, a second rotary element, a third rotary element, and a fourth rotary element in accordance with an order in which the first to fourth rotary elements are arranged in a velocity diagram,
a first clutch as the first engagement element, which is one of the plurality of engagement elements,
a second clutch as the second engagement element, which is one of the plurality of engagement elements,
a first brake, which is one of the plurality of engagement elements,
a second brake as the third engagement element, which is one of the plurality of engagement elements, and
a one-way clutch,
the second rotary element is coupled to the output,
the first clutch is capable of engaging the input with the first rotary element,
the second clutch is capable of engaging the input with the third rotary element,
the first brake is capable of locking the case with the fourth rotary element,
the second brake is capable of locking the case with the third rotary element,
the one-way clutch is engaged in a reversed rotational direction of the third rotary element with respect to the case, and
a first stage, which is the second transmission shift stage, is achieved by engaging the first clutch with the one-way clutch or the second brake, a second stage is achieved by engaging the first clutch with the first brake, a third stage, which is the first transmission shift stage, is achieved by engaging the first clutch with the second clutch, and a fourth stage is achieved by engaging the second clutch with the first brake.

18. The hydraulic pressure control device of a vehicle driving device according to claim 17, further comprising:
a second signal solenoid valve capable of supplying a second signal pressure capable of pushing the spool of the range switcher to the second position.

* * * * *